(12) United States Patent
Chou et al.

(10) Patent No.: US 8,311,672 B2
(45) Date of Patent: Nov. 13, 2012

(54) ROBOT AND CONTROL METHOD THEREOF

(75) Inventors: Hsiao-Chung Chou, Taipei Hsien (TW); Li-Zhang Huang, Taipei Hsien (TW); Chuan-Hong Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 644 days.

(21) Appl. No.: 12/432,687

(22) Filed: Apr. 29, 2009

(65) Prior Publication Data
US 2010/0106296 A1 Apr. 29, 2010

(30) Foreign Application Priority Data
Oct. 24, 2008 (CN) .......................... 2008 1 0305169

(51) Int. Cl.
*G06F 19/00* (2006.01)
*G05B 19/18* (2006.01)
*G05B 11/01* (2006.01)

(52) U.S. Cl. .............. 700/245; 700/1; 700/2; 700/9; 700/12; 700/16; 700/47; 700/48; 700/49; 700/50

(58) Field of Classification Search .................. None
See application file for complete search history.

(56) References Cited

U.S. PATENT DOCUMENTS

| | | | |
|---|---|---|---|
| 5,966,526 A * | 10/1999 | Yokoi .............................. 703/11 |
| 6,227,966 B1 * | 5/2001 | Yokoi .............................. 463/1 |
| 6,442,450 B1 * | 8/2002 | Inoue et al. ................... 700/245 |
| 6,505,098 B1 * | 1/2003 | Sakamoto et al. ............ 700/245 |
| 6,711,469 B2 * | 3/2004 | Sakamoto et al. ............ 700/245 |
| 6,718,232 B2 * | 4/2004 | Fujita et al. ................... 700/245 |
| 7,967,657 B2 * | 6/2011 | Ganz .............................. 446/175 |
| 2003/0060930 A1 * | 3/2003 | Fujita et al. ................... 700/245 |
| 2003/0093280 A1 * | 5/2003 | Oudeyer ....................... 704/266 |
| 2003/0109959 A1 * | 6/2003 | Tajima et al. ................. 700/245 |
| 2003/0216160 A1 * | 11/2003 | Yokoi .............................. 463/1 |
| 2005/0119037 A1 * | 6/2005 | Yokoi .............................. 463/9 |
| 2005/0148390 A1 * | 7/2005 | Murase et al. ................. 463/40 |
| 2005/0246063 A1 * | 11/2005 | Oonaka ......................... 700/245 |
| 2006/0287032 A1 * | 12/2006 | Yokoi .............................. 463/9 |
| 2007/0168942 A1 * | 7/2007 | Kaplan ......................... 717/108 |
| 2008/0192580 A1 * | 8/2008 | Larian ............................ 368/10 |
| 2008/0195566 A1 * | 8/2008 | Lee et al. ....................... 706/14 |
| 2008/0208776 A1 * | 8/2008 | Lee et al. ....................... 706/12 |
| 2008/0215182 A1 * | 9/2008 | Lee et al. ..................... 700/245 |

* cited by examiner

*Primary Examiner* — Ian Jen

(74) *Attorney, Agent, or Firm* — Altis Law Group, Inc.

(57) ABSTRACT

The present invention relates to a robot and a control method adapted for the robot. The method includes a) measuring time; b) performing a normal biological action when the time reaches a beginning time of a biological function; c) judging whether an instruction is received while during the biological function; d) if the instruction is received while during the biological function, fetching an action adjustment parameter of the biological function and performing an output; e) after the output is finished, resuming performing the normal biological action; and f) stopping the normal biological action when the time reaches an ending time of the biological function.

6 Claims, 4 Drawing Sheets

ROBOT AND CONTROL METHOD THEREOF

BACKGROUND

1. Technical Field

The disclosure relates to a robot and, more particularly, to a robot and a control method adapted for the robot.

2. Description of the Related Art

There are a variety of robots on the market today, such as electronic toys, electronic pets, and the like. Some robots can simulate biological functions. For example, a robot may close its eyes to simulate sleeping. What is needed though, is a robot that can respond to instructions from a user related to the simulated biological functions.

BRIEF DESCRIPTION OF THE DRAWINGS

The components in the drawings are not necessarily drawn to scale, the emphasis instead being placed upon clearly illustrating the principles of the robot. Moreover, in the drawings, like reference numerals designate corresponding parts throughout the several views.

DETAILED DESCRIPTION

Figure 1:
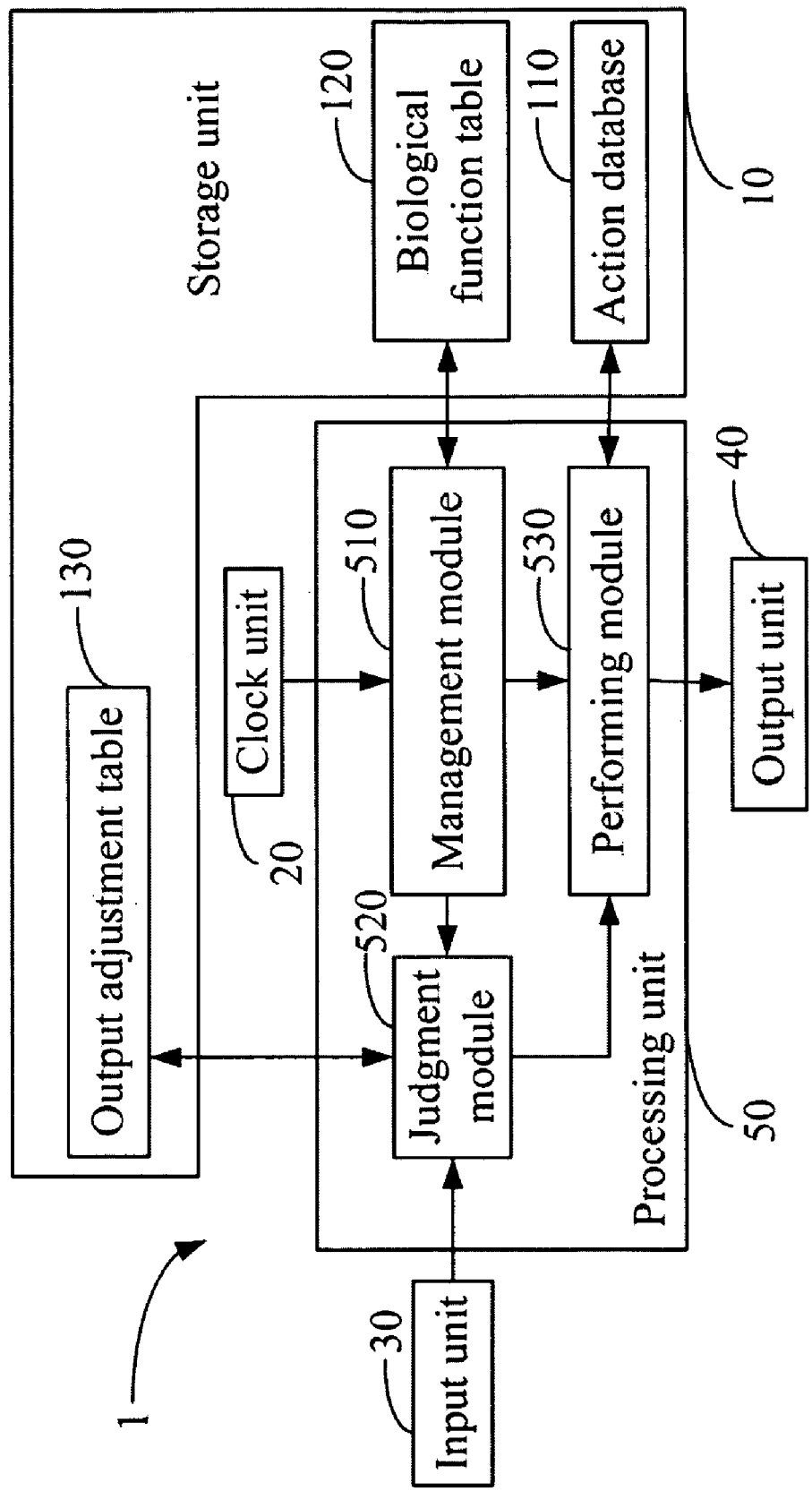
FIG. 1 is a block diagram of a hardware infrastructure of a robot in accordance with an exemplary embodiment.

FIG. 1 is a block diagram of a hardware infrastructure of a robot in accordance with an exemplary embodiment. The robot 1 has a repertoire of actions that simulate biological functions. The actions may include body actions and/or sounds. The robot 1 may be programmed to simulate the biological functions according to a schedule and may also receive instructions from a user.

The robot 1 includes a storage unit 10, a clock unit 20, an input unit 30, an output unit 40, and a processing unit 50. The storage unit 10 stores an action database 110, a biological function table 120 of the robot 1, and an output adjustment table 130 of the robot 1. The action database 110 stores a list of normal biological actions and predetermined actions to be performed by the robot 1. The robot 1 performs the normal biological actions during the biological functions. When the robot 1 is not during the biological functions and receives the instructions from the user, the robot 1 performs the predetermined actions.

Figure 2:
FIG. 2 is an example of a biological function table of the robot of FIG. 1.

FIG. 2 is an example of the biological function table 120 of the robot of FIG. 1. The biological function table 120 stores relationships among biological functions of the robot 1, time periods, and normal biological actions. The biological function table 120 of the robot 1 includes a biological function column, a time period column, and a normal biological action column. The biological function column records a plurality of biological functions of the robot 1, such as "sleeping," "eating," and the like.

Each of the biological functions is assigned a time period. The time period column records a time period of each biological function of the robot 1. Each time period includes a beginning time and an ending time. For example, 23:00 pm is the beginning time and 8:00 am is the ending time of the "sleeping" biological function. At 23:00 pm the robot 1 begins the "sleeping" biological function, and at 8:00 am the robot 1 ends the "sleeping" biological function. The normal biological action column records a normal biological action of each biological function performed by the robot 1. Once the robot 1 enters a biological function, the robot 1 performs the normal biological action of the biological function until the ending time of the biological function comes.

Figure 3:
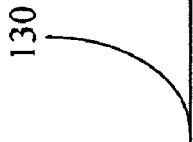
FIG. 3 is an example of an output adjustment table of the robot of FIG. 1.

FIG. 3 is an example of the output adjustment table 130 of the robot of FIG. 1. The output adjustment table 130 stores relationships among the biological functions, user instructions, action adjustment parameters, and outputs. The output adjustment table 130 includes the biological function column (the same as in FIG. 2), a user instruction column, an action adjustment parameter column, and an output column. The user instruction column records a plurality of instructions from the input unit 30 in response to user input during the biological functions, such as a "touch head" instruction during the "sleeping" biological function, a "how are you" sound instruction during the "eating" biological function, and the like. In this way a user can vary the robots performance of actions in an entertaining or educational way, rather than solely relying on the robots schedule.

The action adjustment parameter column records an action adjustment parameter of each of the biological functions. For example, the action adjustment parameter of the "sleeping" biological function is assigned "action/sound slowly," and the action adjustment parameter of the "eating" biological function is assigned "action slowly and sound lower." The output column records a plurality of outputs to be performed by the robot 1. When the robot 1 receives an instruction from the input unit 30 during a biological function, the processing unit 50 performs an output according to the action adjustment parameter of the biological function and pauses the normal biological action of the biological function. For example, when the robot 1 receives the "touch head" instruction from the input unit 30 while during the "sleeping" biological function, the processing unit 50 controls the robot 1 to open eyes and walk slowly. When the robot 1 receives the "how are you" sound instruction from the input unit 30 while during the "eating" biological function, the processing unit 50 controls the robot 1 to stand up and say "not bad" quietly. If the robot 1 is not during the biological functions and receives the "touch head" instruction from the input unit 30, the processing unit 50 only controls the robot 1 to walk in an average speed.

The clock unit 20 is configured for measuring time. The input unit 30 is configured for generating the instructions in response to user input. The output unit 40 is configured for outputting an action. The processing unit 50 further includes a management module 510, a judgment module 520, and a performing module 530. The management module 510, connected to the clock unit 20, is configured for managing each biological function of the robot 1. When the time of the clock unit 20 reaches a beginning time of a biological function, the management module 510 fetches a normal biological action of the biological function from the biological function table 120 and controls the performing module 530 to begin performing the normal biological action defined in the action database 110, and the output unit 40 begins outputting the normal biological action. When the time of the clock unit 20 reaches an ending time of the biological function, the management module 510 finishes the biological function and controls the performing module 530 to stop the normal biological action.

The judgment module 520 is configured for judging whether the input unit 30 generates the instructions in response to user input during the biological functions. If the input unit 30 generates an instruction while during a biological function, the judgment module 520 controls the performing module 530 to pause the normal biological action of the biological function, and fetches the action adjustment parameter of the biological function from the output adjustment table 130 and controls the performing module 530 to perform an output according to the action adjustment parameter, the output unit 40 outputs the output.

Figure 4:
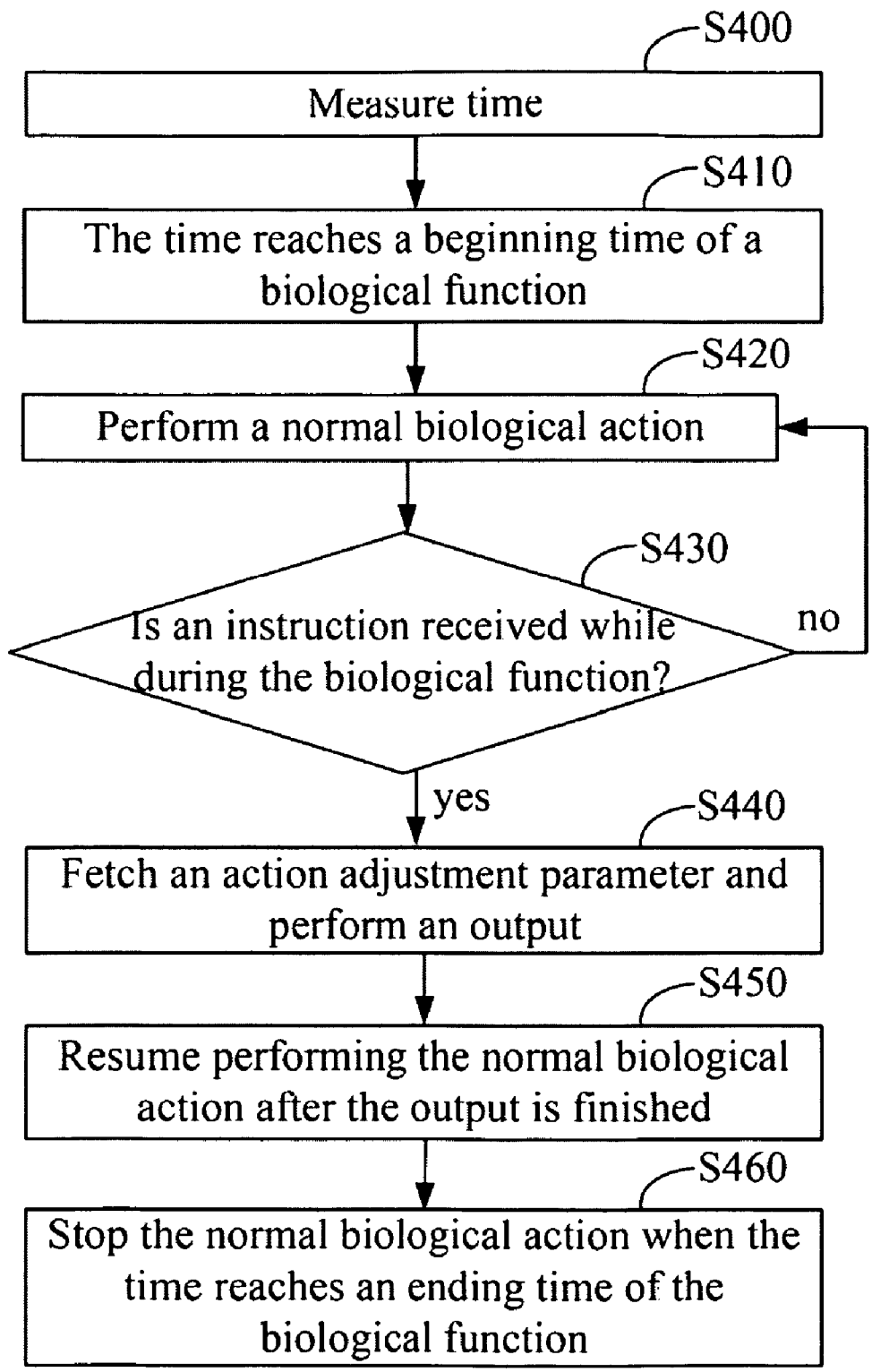
FIG. 4 is a flowchart illustrating a control method implemented by the robot of FIG. 1.

FIG. 4 is a flowchart illustrating a control method implemented by the robot of FIG. 1. In step S400, the clock unit 20 measures time. In step S140, the time of the clock unit 20 reaches the beginning time of the biological function. In step S420, the management module 510 fetches a normal biological action of the biological function from the biological function table 120 and controls the performing module 530 to begin performing the normal biological action defined in the action database 110, and the output unit 40 outputs the normal biological action. In step S430, the judgment module 520 judges whether the instruction from the input unit 30 is received while during the biological function. If the instruction is not received during the biological function, the procedure returns to step S420.

If the instruction is received while during the biological function, in step S440, the judgment module 520 fetches the action adjustment parameter of the biological function from the output adjustment table 130 and controls the performing module 530 to perform the output according to the action adjustment parameter. In step S450, after the output is finished, the judgment module 520 controls the performing module 530 to resume performing the normal biological action of the biological function. In step S460, when the time of the clock unit 20 reaches the ending time of the biological function, the management module 510 controls the performing module 530 to stop the normal biological action.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A robot, comprising:
    a clock unit for measuring time;
    an input unit for generating a plurality of instructions in response to user input;
    an output unit for outputting an action;
    a storage unit for storing a plurality of biological functions of the robot, a plurality of first relationships among the plurality of biological functions, a plurality of time periods, and a plurality of normal biological actions, a plurality of second relationships among the plurality of biological functions, the plurality of instructions, a plurality of action adjustment parameters of the biological functions, and a plurality of outputs, wherein each time period comprises the beginning time and the ending time of each biological function;
    a management module for fetching a normal biological action of a biological function by a processor unit based on one of the first relationships from the storage unit when the time of the clock unit reaches the beginning time of the biological function, and controlling the output unit to begin performing the normal biological action until the ending time of the biological function comes; and
    a judgment module for judging whether the input unit generates an instruction by a processor unit while during the biological function, if the input unit generates the instruction while during the biological function, interrupting the normal biological action of the biological function, fetching an action adjustment parameter of the biological function in response to the instruction from a user based on one of the second relationships from the storage unit and controlling the output unit to perform an output corresponding to the fetched action adjustment parameter, and after the output is finished, controlling the output unit to resume performing the normal biological action.

2. The robot as recited in claim 1, wherein when the robot is not during the biological function and the input unit generates the instruction, the judging module controls the output unit to output a predetermined action from the storage unit.

3. The robot as recited in claim 1, wherein the plurality of actions are a plurality of body actions and/or a plurality of sounds.

4. A control method for a robot, wherein the robot stores a plurality of biological functions, a plurality of first relationships among the plurality of biological functions, a plurality of time periods, and a plurality of normal biological actions, a plurality of second relationships among the plurality of biological functions, a plurality of instructions, a plurality of action adjustment parameters of the biological functions, and a plurality of outputs, and each time period comprising the beginning time and the ending time of each biological function, the method comprising:
    measuring time;
    performing a normal biological action based on one of the first relationships by a processor unit when the time reaches the beginning time of a biological function;
    judging whether an instruction is received while during the biological function by a processor unit;
    if the instruction is received while during the biological function, interrupting the normal biological action of the biological function, fetching an action adjustment parameter of the biological function in response to the instruction from a user based on one of the second relationships and performing an output corresponding to the fetched action adjustment parameter;
    after the output is finished, resuming performing the normal biological action; and
    stopping the normal biological action when the time reaches the ending time of the biological function.

5. The control method as recited in claim 4, further comprising:
    when the robot is not during the biological function and the instruction is received, performing a predetermined action.

6. The control method as recited in claim 4, wherein the plurality of actions are a plurality of body actions and/or a plurality of sounds.

* * * * *